United States Patent
Leimann

(10) Patent No.: US 7,472,619 B2
(45) Date of Patent: Jan. 6, 2009

(54) GEAR UNIT

(75) Inventor: Dirk-Olaf Leimann, Antwerp (BE)

(73) Assignee: Hansen Transmissions International NV, Antwerp (BE)

( * ) Notice: Subject to any disclaimer, the term of this patent is extended or adjusted under 35 U.S.C. 154(b) by 740 days.

(21) Appl. No.: 10/506,986

(22) PCT Filed: Mar. 4, 2003

(86) PCT No.: PCT/IB03/00791

§ 371 (c)(1),
(2), (4) Date: Apr. 15, 2005

(87) PCT Pub. No.: WO03/076833

PCT Pub. Date: Sep. 18, 2003

(65) Prior Publication Data

US 2005/0172743 A1      Aug. 11, 2005

(30) Foreign Application Priority Data

Mar. 9, 2002   (GB)   ................... 0205569.7

(51) Int. Cl.
*F16H 1/18*   (2006.01)
(52) U.S. Cl. .................. 74/424.5; 74/412 R; 384/571
(58) Field of Classification Search .......... 74/412 R, 74/413, 414, 424.5, 458; 384/571
See application file for complete search history.

(56) References Cited

U.S. PATENT DOCUMENTS

| | | | |
|---|---|---|---|
| 3,648,533 A | 3/1972 | Parenti | |
| 3,894,621 A | 7/1975 | Quick | |
| 4,025,136 A | 5/1977 | Ballendux | |
| 4,297,906 A | 11/1981 | Costello | |
| 4,890,504 A * | 1/1990 | Carrigan et al. | ............... 74/458 |
| 5,018,402 A | 5/1991 | Roerig et al. | |
| 5,096,034 A * | 3/1992 | Foster | ............... 192/51 |
| 5,588,328 A | 12/1996 | Nihei et al. | |
| 2003/0185477 A1* | 10/2003 | Taki et al. | ............... 384/475 |
| 2004/0087408 A1* | 5/2004 | Ziech et al. | ............... 475/222 |
| 2005/0103141 A1* | 5/2005 | Kang | ............... 74/458 |
| 2007/0269157 A1* | 11/2007 | Fahrni et al. | ............... 384/569 |

* cited by examiner

*Primary Examiner*—David M Fenstermacher
(74) *Attorney, Agent, or Firm*—Young & Thompson

(57) ABSTRACT

A gear unit includes a housing, two shafts arranged parallel with one another and each supporting a helically cut toothed gear, and two pairs of bearings supported by or relative to the housing in an arrangement in which each pair of bearings rotatably supports a shaft with the toothed gears of the two shafts being rotatable one relative to the other in mutual engagement. Two bearings of the two shafts lying to a common side of the inter-engaged helical gears are supported by a substantially common wall section of the gear unit housing, one of the two bearings being arranged to transmit to the housing wall section axial forces acting in a direction from the gears to the bearing and the other bearing being arranged to transmit to the wall section axial forces acting in a direction from the other bearing to the gears.

8 Claims, 3 Drawing Sheets

GEAR UNIT

This is a 371 National Stage application of International application no. PCT/IB03/00791, filed Mar. 4, 2003, which claims priority to Great Britain application no. 0205569.7, filed Mar. 9, 2002. The entire contents of the above-referenced applications are hereby incorporated by reference in their entirety.

This invention relates to a gear unit and in particular, though not exclusively, to a gear unit comprising at least one pair of parallel shafts and a pair of helical gears.

BACKGROUND OF THE INVENTION

Although helical gears provide a smoother and quieter transmission of torque between two rotatable shafts, they inherently tend to generate axial forces acting in the direction of the axis about which a gear rotates.

The axially generated forces created when helical gears transmit torque act on the gear unit housing via shaft support bearings. The resulting deformation of the gear unit housing has an adverse effect on the axial clearance or preload of the support bearings. Particularly in the case of bearings of the taper roller type that can have a significant adverse effect on the bearing performance and life, and potentially also an adverse effect on the smoothness and general performance of the helical gears.

It is well known that the axial forces can be avoided by providing a pair of helical gears on a common shaft with one gear of the pair comprising teeth which extend helically in a direction opposite to the teeth of the other gear of the pair. That, however, often is not a satisfactory solution because of additional costs and restriction on other aspects of the gear unit design.

Another technique which may be employed to minimise the effect of axial forces on bearing clearance and preload is to selectively strengthen the housing wall so that it is better able to resist significant defamation. That, however, requires the use of additional material, thereby increasing weight and cost as well as overall dimensions.

SUMMARY OF THE INVENTION

One object of the present invention is to provide a gear unit which is better able to resist the effect of axial forces arising in a pair of parallel shafts.

In accordance with one aspect of the present invention a gear unit comprises a housing, two shafts arranged parallel with one another and each supporting a helically cut toothed gear, and two pairs of bearings supported by or relative to the housing in an arrangement in which each pair of bearings rotatably supports a shaft with the toothed gears of the two shafts being rotatable one relative to the other in mutual engagement, wherein two bearings of the two shafts lying to a common side of the inter-engaged helical gears are supported by a substantially common wall section of the gear unit housing, one of said two bearings being arranged to transmit to said housing wall section axial forces acting in a direction from the gears to the bearing and the other bearing being arranged to transmit to said wall section axial forces acting in a direction from said other bearing to the gears.

The other two bearings, typically lying to the other side of the inter-engaged helical gears, may be similarly arranged such that a second wall section of the housing, opposite the aforementioned wall section, may be acted on simultaneously by opposing axial forces exerted by the two shafts. The bearings preferably are each of a type, or arranged, such that for each of the two shafts, axial forces acting in one direction are transmitted to a housing wall section by only one of the two bearings of that shaft. If any axial forces of that shaft act in an opposite direction (e.g. if the shafts are provided with helical gears of a reversed helix angle) those forces may be transmitted to a wall section only by the other of the two bearings of that shaft.

Each of said bearings may be of a type known per se, for example it may comprise ball bearings, cylindrical or spherical roller bearings.

The bearings of one of the two shafts may be arranged in the manner of an X type bearing configuration in which axial forces are transmitted from an inner ring to an outer ring, and therefore to a housing wall section in a direction away from the gears, and the bearings of the other shaft are disposed in the equivalent of an O type configuration, with axial forces being transmitted from the inner ring to the outer ring and thus to a housing wall section in a direction from the bearing towards the gears.

A particularly suitable type of bearing is a taper roller bearing, and the bearings of one of the two shafts may be arranged in an O configuration and those of the other shaft in an X configuration.

Accordingly the present invention provides also a gear unit comprises a housing, two shafts arranged parallel with one another and each supporting a helically cut toothed gear, and two pairs of taper roller bearings supported by or relative to the housing in an arrangement in which each pair of bearings rotatably supports a shaft with the toothed gears of the two shafts being rotatable one relative to the other in mutual engagement, the pair of taper roller bearings of one shaft being provided axially spaced in an O configuration in which the diameter of the bearing rollers of each bearing increases progressively in the direction away from the other bearing of the pair, and the taper roller bearings of the other shaft being provided axially spaced in an X configuration in which the diameter of the bearing rollers of each bearing decreases progressively in the direction away from the other bearing of the pair.

An arrangement of a pair of axially spaced taper roller bearings in which the bearing rollers of one bearing increase in diameter in a direction away from the other bearing of the pair is referred to as an O bearing configuration. An arrangement of a pair of axially spaced bearings in which the bearing rollers of one bearing decrease in diameter in a direction away from the other bearing of the pair is referred to as an X bearing configuration.

The invention envisages that each shaft may have a helical gear thereof positioned axially between the bearings of that shaft, and that the bearings of a pair are positioned respectively in substantially mutually opposite wall sections of the housing.

Embodiments of the present invention will now be described, by way of example only, with reference to the accompanying diagrammatic drawings in which:

DETAILED DESCRIPTION OF THE DRAWINGS

DETAILED DESCRIPTION OF THE INVENTION

Figure 1:
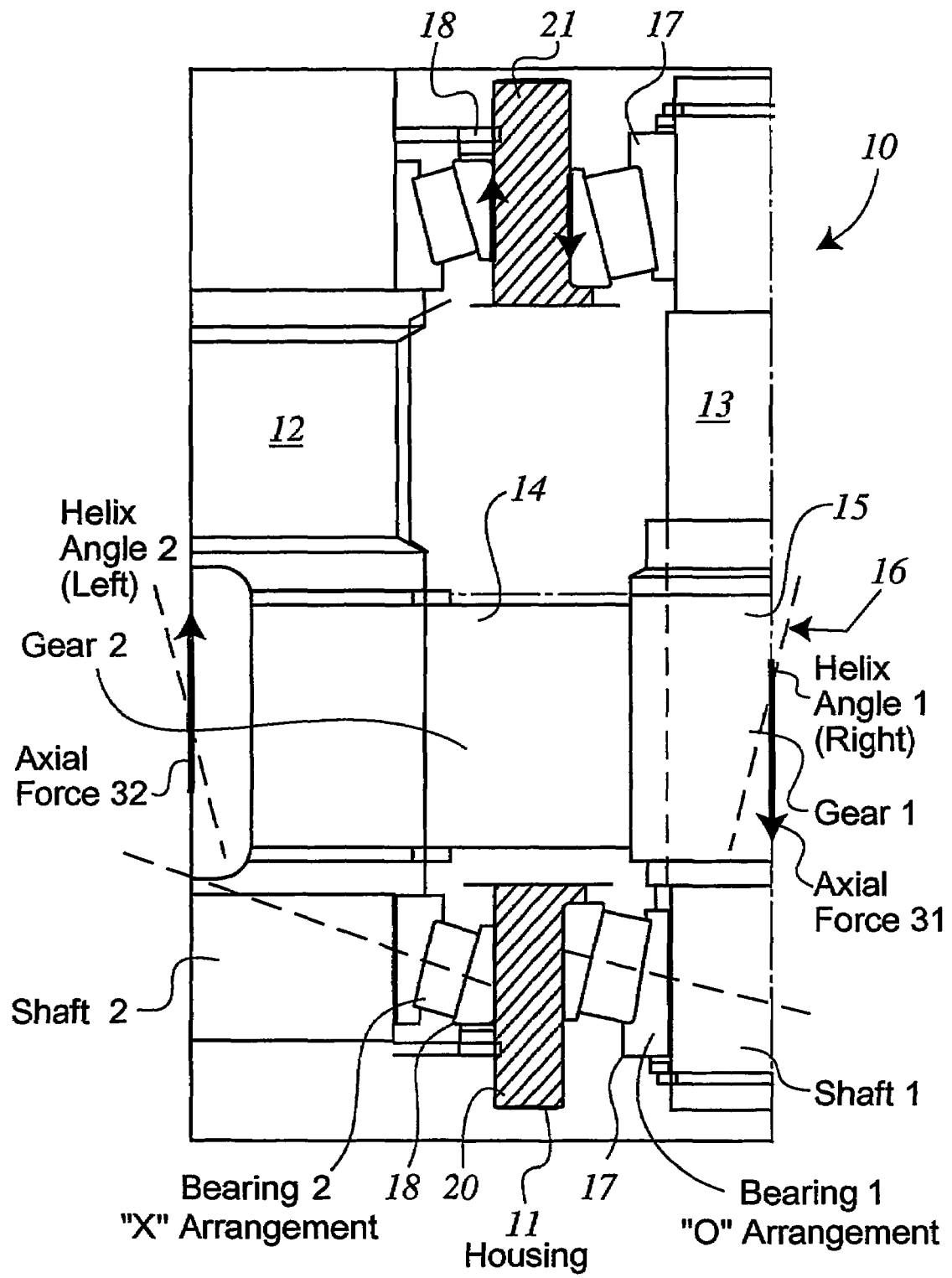
FIG. 1 is a sectional view of part of a gear unit accordance with the present invention.

A gear unit 10 (see FIG. 1) comprises a housing 11 having mutually opposite side wall sections 20, 21 and two mutually parallel shafts 12, 13. The shaft 12 has secured thereto a helically cut toothed gear 14 and the shaft 13 is provided with a helically cut pinion gear 15. The line of action of inter-engaging gear teeth is shown by the line 16 in the accompanying drawing.

Shaft 12 is rotatably supported relative to the housing 11 by a pair of axially spaced taper roller bearings 18, the bearings of that pair being located respectively in the opposite side wall sections 20, 21 of the housing 11. The bearings 18 are arranged in an X configuration in which the diameter of each bearing roller decreases in the direction away from the other bearing of the pair.

The shaft 13 is similarly rotatably supported relative to the housing by means of a pair of axially spaced taper roller bearings 17, except that the bearings of this pair are mounted in a reverse manner, in an O configuration.

In use of the aforedescribed gear unit, when torque is transmitted between the gears 14, 15, there results an axial force 31 on the shaft 13 and an axial force 32 on the shaft 12. Reaction forces to counter the axial forces 31, 32 are transmitted to a common wall section, section 21, by virtue of the orientation of the taper roller bearings. Thus, in contrast to a conventional gear arrangement in which the mutually parallel shafts are supported by pairs of bearings each arranged in the same O or X configuration, which results in the reaction forces being carried by opposite wall sections, and consequential deformation of the wall sections relative to one and another, by the present invention the reaction forces act at a common wall section and thus do not result in any adverse effect on bearing clearance or preload.

Figure 2:
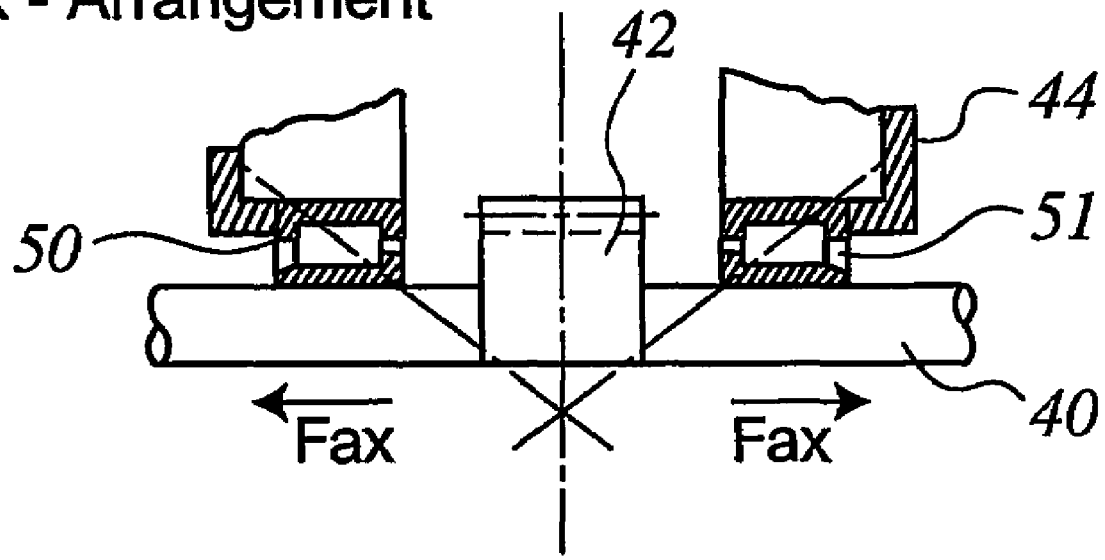
FIG. 2 is a sectional view of part of another gear unit in accordance with the present invention.
Figure 2:
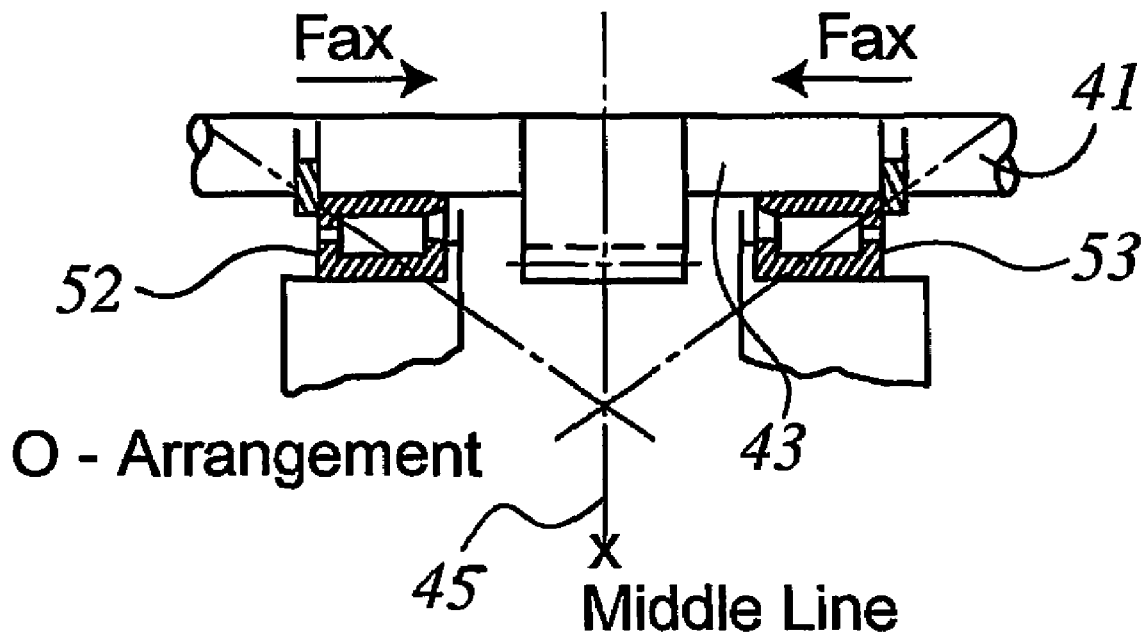

FIG. 2 shows two shafts 40,41 each carrying a helically cut gear 42,43, the two shafts 40,41 being rotatably mounted relative a housing 44 with the two gears 42,43 in mutual inter-engagement to transmit torque therebetween.

Each shaft is rotatably supported relative to a wall section of the gear unit housing 44 by a pair of cylindrical roller bearings respectively disposed at opposite sides of the gears 42,43, i.e. at opposites sides of a notional middle line 45 as shown in FIG. 2. Each of the four cylindrical bearings is of the kind which can transmit axial forces in one direction in addition to radial forces.

The bearings 50,51 of the shaft 40 are arranged in a manner equivalent to an X type configuration such that axial forces in a direction from the middle line 45 to the bearing 50 are resisted by that bearing, whereas axial forces acting in the opposite direction, towards the bearing 51, and arising when the direction of rotation of the gear unit 42 is reversed, act on said bearing 51. In contrast, for the shaft 41 the two bearings 52,53 are arranged in a manner equivalent to an O type configuration. Thus for the bearing 52, axial forces are transmitted from the inner to the outer ring of the bearing in the case of axial forces acting a direction from the bearing 52 to said middle line 45. Bearing 53 similarly transmits to the housing 44 forces acting in a direction from the bearing 53 to said middle line 45. In consequence, that section of the housing wall common to the region of the bearings 50,52 experiences substantially equal and opposite forces from the shafts 40,41 and similarly, if use is made of gears 42,43 of a reversed helix angle, the housing wall section common to the bearings 51,53 likewise experiences substantially equal and opposite axial forces from the shafts 40,41.

Figure 3:
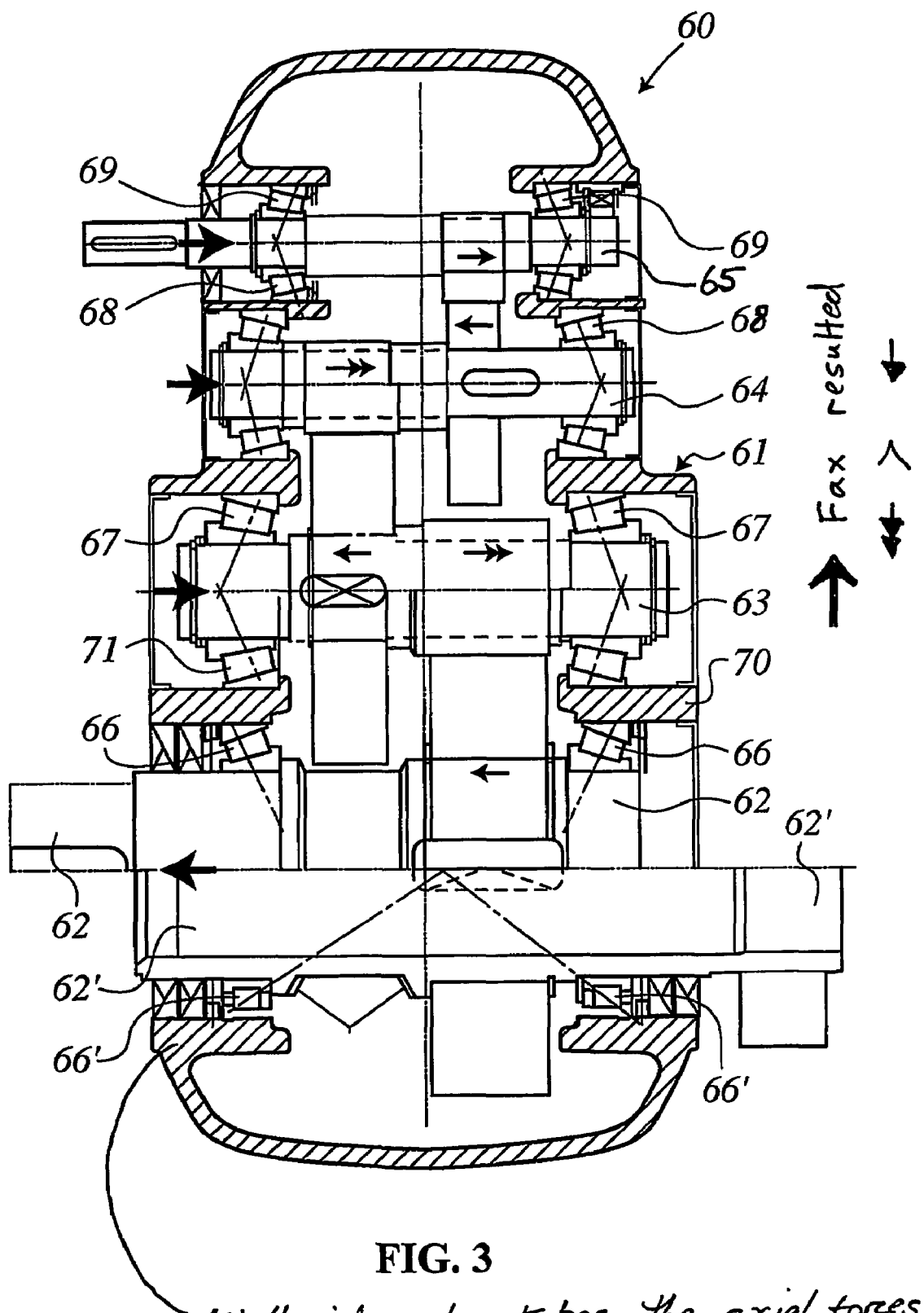
FIG. 3 is a sectional view of a multi-stage gear unit in accordance with the present invention.

The present invention can be applied also to a multistage gear unit. FIG. 3 shows a three stage gear unit 60 comprising a housing 61 in which four shafts 62,63,64,65 are rotatably supported by means of roller bearings. Shaft 62 is rotatably supported by a pair taper roller bearings 66 arranged in an X configuration, or alternatively by a pair of cylindrical bearings 66' arranged also in an X configuration (as shown on alternative shaft section 62') and which can transmit axial forces in one direction in addition to radial forces. Shaft 63 is rotatably supported by a pair of taper roller bearings 67 in an O configuration. The two shaft 64, 65 are each similarly supported by pairs of taper roller bearings 68,69 arranged in an O configuration.

The main axial forces arising in the respective shafts are experienced by the low speed shaft 62. These axial forces, as exerted on one of the housing wall sections 70,71 at either side of the gear unit depending on the orientation of the helix angle of the gear teeth, are therefore countered by axial forces in the neighboring shaft 63. Thus the effective axial shaft forces acting on the housing are substantially reduced as compared with a configuration in which all of the shafts are, for example, mounted by taper roller bearings in an O configuration.

Whilst the invention has been described in respect of each shaft being supported solely by one pair of bearings, it is to be understood that each shaft could be supported by additional pairs of bearings, typically all bearings on the shaft being of the same O or X configuration. Additionally, auxiliary bearing support may by provided by, for example, roller or spherical bearings which may be in combination with taper roller bearings.

The invention claimed is:

1. A gear unit comprising:
   a housing,
   two shafts arranged parallel with one another and each supporting a helically cut toothed gear, and
   two pairs of bearings supported by or relative to the housing in an arrangement in which each pair of said bearings rotatably supports one of said two shafts with the helically cut toothed gears, said two shafts being rotatable one relative to the other in mutual engagement,
   wherein said two pairs of bearings of the two shafts lying to a common side of the inter-engaged helically cut toothed gears are supported by a substantially common wall section of the gear unit housing,
   one of said two pairs of bearings being arranged to transmit axial forces to said common housing wall section in a direction from the helically cut toothed gears to said one bearing, and the other bearing being arranged to transmit axial forces to said common housing wall section in a direction from said other bearing to the helically cut toothed gears.

2. The gear unit according to claim 1, wherein said two pairs of bearings of the two shafts lying to a common side of the inter-engaged helically cut toothed gears are taper roller bearings.

3. The gear unit according to claim 1, wherein the bearings of one shaft are arranged in the manner of an X type bearing configuration and the bearings of the other shaft are arranged in an O type configuration.

4. A gear unit comprising:
   a housing,
   two shafts arranged parallel with one another and each supporting a helically cut toothed gear, and two pairs of taper roller bearings supported by or relative to the housing in an arrangement in which each pair of said taper roller bearings rotatably supports one of said two shafts with the helically cut toothed gears, said two shafts being rotatable one relative to the other in mutual engagement, wherein one of said pair of taper roller bearings is axially spaced in an O configuration in which the diameter of the bearing rollers of each bearing increases progressively in a direction away from the other bearing of the pair, and the taper roller bearings of the other shaft is axially spaced in an X configuration in which the diameter of the bearing rollers of each bearing decreases progressively in a direction away from the other bearing of the pair.

5. The gear unit according to claim 1, wherein each of said two shafts comprises a helical gear positioned axially between the pair of bearings of that shaft.

6. The gear unit according to claim 1, further comprising at least three mutually parallel shafts each provided with a helically cut toothed gear and rotatably supported in said housing by a pair of bearings, one of said mutually parallel shafts being a low speed shaft that is rotatably supported by said bearings arranged in an X or O configuration of a type opposite the configuration of the bearings of a neighboring shaft.

7. The gear unit according to claim 6, wherein the low speed shaft is rotatably supported by said bearings arranged in an X or O configuration, and the gear unit comprises at least two additional shafts each rotatably supported by said bearings arranged in the same configuration as one another, and opposite the configuration of the low speed shaft.

8. The gear unit according to claim 7, wherein the low speed shaft is rotatably supported by said bearings arranged in an X type configuration.

* * * * *